(12) United States Patent
Harutyunyan et al.

(10) Patent No.: US 7,214,361 B2
(45) Date of Patent: May 8, 2007

(54) METHOD FOR SYNTHESIS OF CARBON NANOTUBES

(75) Inventors: Avetik Harutyunyan, Columbus, OH (US); Leonid Grigorian, Columbus, OH (US); Toshio Tokune, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 612 days.

(21) Appl. No.: 10/304,317

(22) Filed: Nov. 26, 2002

(65) Prior Publication Data

US 2004/0101467 A1    May 27, 2004

(51) Int. Cl.
*C01B 31/02*    (2006.01)
(52) U.S. Cl. .............. 423/447.3; 977/891; 977/842
(58) Field of Classification Search ................ None
See application file for complete search history.

(56) References Cited

U.S. PATENT DOCUMENTS

| | | | |
|---|---|---|---|
| 5,165,909 A | 11/1992 | Tennent et al. | |
| 5,618,475 A | 4/1997 | Johnson et al. | |
| 5,665,277 A | 9/1997 | Johnson et al. | |
| 5,759,230 A | 6/1998 | Chow et al. | |
| 5,783,263 A | 7/1998 | Majetich et al. | |
| 6,436,167 B1 | 8/2002 | Chow et al. | |
| 6,624,070 B2* | 9/2003 | Merricks et al. | 438/678 |
| 6,875,253 B2* | 4/2005 | Daimon et al. | 75/255 |
| 2002/0184969 A1* | 12/2002 | Kodas et al. | 75/330 |
| 2003/0133865 A1* | 7/2003 | Smalley et al. | 423/447.1 |

FOREIGN PATENT DOCUMENTS

| | | |
|---|---|---|
| JP | S53-91054 | 8/1978 |
| JP | S56-136904 | 10/1981 |
| JP | S61-69906 | 4/1986 |
| JP | 11-246901 | 9/1999 |
| JP | H11-293308 | 10/1999 |
| JP | 2001-254109 | 9/2001 |
| JP | 2002-255519 | 9/2002 |
| WO | WO 01/49599 | * 7/2001 |

OTHER PUBLICATIONS

Harutyunyan, A.R. et al., "CVD Synthesis of Single Wall Carbon Nanotubes Under 'Soft' Conditions", Nano Letters, vol. 2, No. 5, 2002, pp. 525-530.*
Dubrovinsky, L. et al., "Pressure-Induced Invar Effect in Fe—Ni Alloys", *Phys. Rev. Lett.*, vol. 88 No. 21, May 21, 2000, pp. 4851-4854.

(Continued)

*Primary Examiner*—Wayne A. Langel
*Assistant Examiner*—Paul Wartalowicz
(74) *Attorney, Agent, or Firm*—Mark Duell; Narinder Banait; Fenwick & West LLP

(57) ABSTRACT

Carbon nanotubes are formed by chemical vapor deposition using metal nanoparticles as a growth substrate. Control over the size and properties of the carbon nanotubes is achieved by controlling the size of the metal nanoparticles in the growth substrate. The metal nanoparticles of a controlled size may be formed by a thermal decomposition reaction of a metal salt in a passivating solvent.

21 Claims, 9 Drawing Sheets

OTHER PUBLICATIONS

Gotic, M. et al., "Formation of Nanocrystalline NiFe$_2$O$_4$", *Philos. Mag. Lett.*, vol. 78, No. 3, Sep. 1998, pp. 193-201.

Hornyak, G.L. et al., "A Temperature Window for Chemical Vapor Decomposition Growth of Single-Wall Carbon Nanotubes", *J. Phys. Chem. B.*, vol. 106, Feb. 2002, pp. 2821-2825.

Kodama, R.H., "Magnetic Nanoparticles", *J Magnetism & Magnetic Mat.*, vol. 200, 1999, pp. 359-372.

Nieuwenhuys, G.J., "Magnetic Behavior of Cobalt, Iron and Manganese Dissolved in Palladium", *Adv. In Phys.*, vol. 24, No. 4, Jul. 1975, pp. 515-591.

Oswald, A., et al., "Giant Moments in Palladium", *Physical Review Letters*, vol. 56, No. 13, Mar. 31, 1986, pp. 1419-1422.

Pannaparayil, T. et al., "A Novel Low-Temperature Preparation of Several Ferrimagnetic Spinels and Their Magnetic and Mossbauer Characterization", *J. Appl. Phys.*, vol. 64, No. 10, Nov. 15, 1988, pp. 5641-5643.

Prasad, S. & Gajbhiye, N.S., "Magnetic Studies of Nanosized Nickel Ferrite Particles Synthesized by the Citrate Precursor Technique", *J. Alloys & Compounds*, vol. 265, 1998, pp. 87-92.

Wang, Y.F. et al., "Graphical Method for Assigning Raman Peaks of Radial Breathing Modes of Single-Wall Carbon Nanotubes", *Chem. Phys. Letters*, vol. 336, 2001, pp. 47-52.

Zaluska, A. et al., "Nanocrystalline Magnesium for Hydrogen Storage", *J. Alloys & Compounds*, vol. 288, 1999, pp. 217-225.

Ziolo, R.F., "Matrix-Mediated Synthesis of Nanocrystalline gamma-Fe$_2$O$_3$: A New Optically Transparent Magnetic Material", *Science*, vol. 257, Jul. 10, 1992, pp. 219-223.

Burns, P. et al, "Emulsion/Aggregation Technology: A Process for Preparing Miicrospheres of Narrow Polydispersity", *Proc. Of Fourth Int'l Conf. On Scientific & Clinical Applications of Magnetic Carriers*, May 9-11, 2002, Tallahassee, FL, pp. 162-164.

Cheung, C.L. et al., "Diameter-Controlled Synthesis of Carbon Nanotubes", *J. Phys. Chem. B*, vol. 106, No. 10, 2002, pp. 2429-2433.

Fu L. et al., "Synthesis & Patterning of Magnetic Nanostructures", *Proc. Of Fourth Int'l Conf. On Scientific & Clinical Applications of Magnetic Carriers*, May 9-11, 2002, Tallahassee, FL, pp. 170-171.

Puntes, V.F. et al., "Tuning the SP (superparamagnetic) to FM (ferromagnetic) Transition of Cobalt Nanoparticles in View of Biomedical Applications", *Proc. Of Fourth Int'l Conf. On Scientific & Clinical Applications of Magnetic Carriers*, May 9-11, 2002, Tallahassee, FL, pp. 143-146.

Suslov, A., "Synthesis of Magnetic Cluster Nanoparticles", *Proc. Of Fourth Int'l Conf. On Scientific & Clinical Applications of Magnetic Carriers*, May 9-11, 2002, Tallahassee, FL, pp. 214-216.

Wilson, K.S., "A Generalized Method for Magnetite Nanoparticle Steric Stabilization Utilizing Block Copolymers Containing Carboxylic Acids", *Proc. Of Fourth Int'l Conf. On Scientific & Clinical Applications of Magnetic Carriers*, May 9-11, 2002, Tallahassee, FL, pp. 220-223.

Bladh K. et al., "On the Iron-Catalysed Growth of the Single-Walled Carbon Nanotubes and Encapsulated Metal Particles in the Gas Phase," Applied Physics A, Materials Science & Processing, Mar. 1, 2000, pp. 317-322, Springer-Verlag, Published Online.

Hafner, Jason H. et al., "Catalytic Growth of Single-Wall Carbon Nanotubes from Metal Particles," Chemical Physics Letters, Sep. 27, 1996, pp. 195-202, Elsevier.

Hernadi, K. et al., "Carbon Nanotubes Production over Co/Silica Catalysts," Catalysis Letters, pp. 229-238, J.C. Baltzer AG.

Hongjie Dai, et al., "Single-Wall Nanotubes Produced by Metal-Catalyzed Disproportionation of Carbon Monoxide," Chemical Physics Letters, Sep. 27, 1996, pp. 471-475, Elsevier.

Lei, An et al., "Synthesis of Nearly Uniform Single-Walled Carbon Nanotubes Using Identical Metal-Containing Molecular Nanoclusters as Catalysts," JACS Communications, pp. 13688-13689, Oct. 26, 2002, Published on the Web.

* cited by examiner

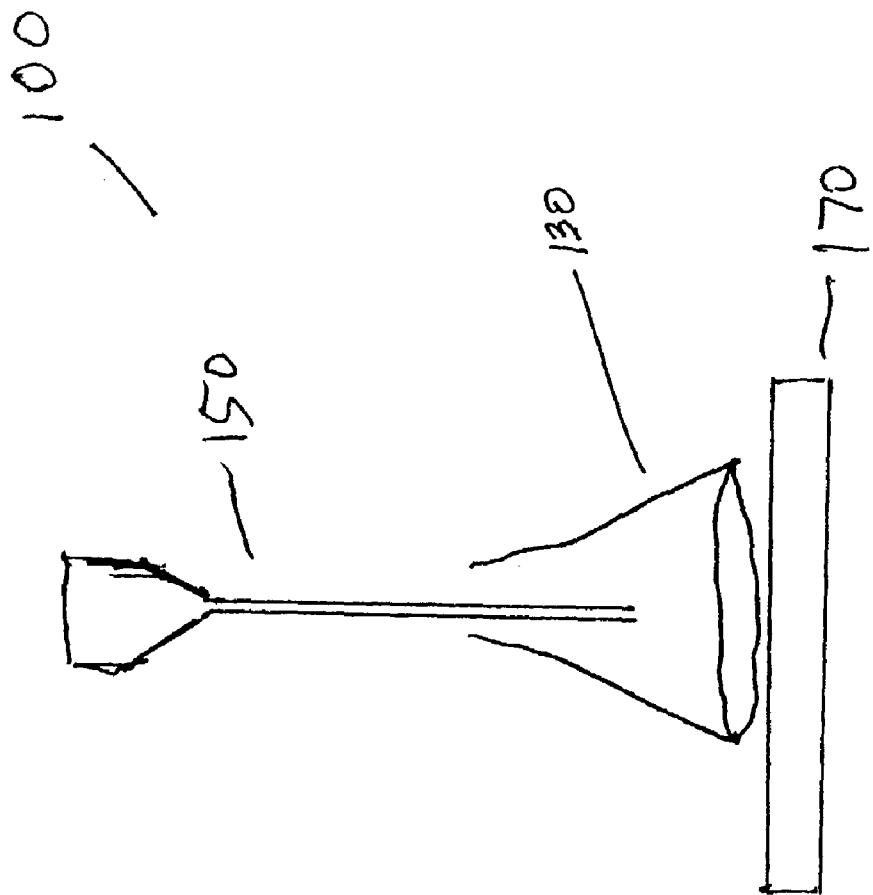

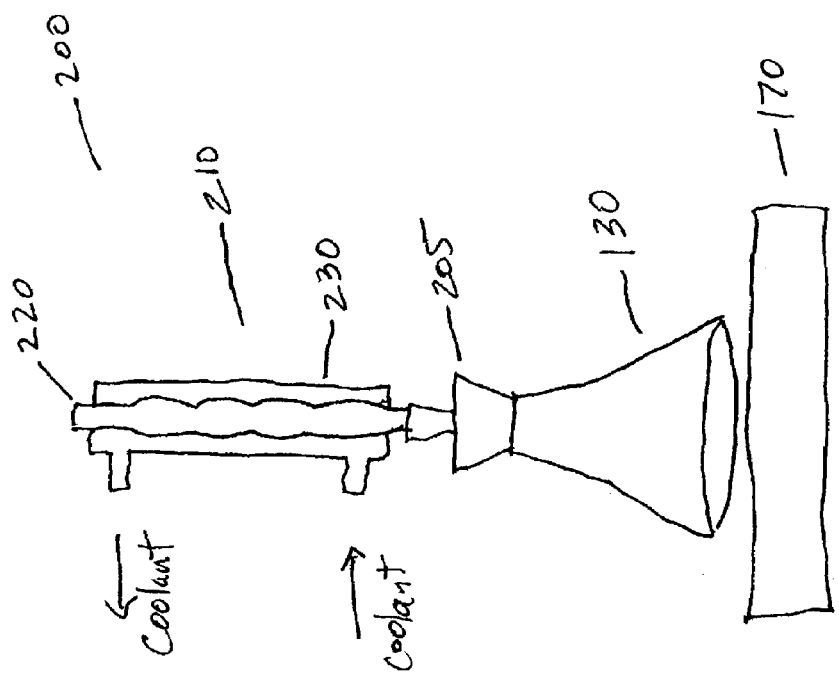

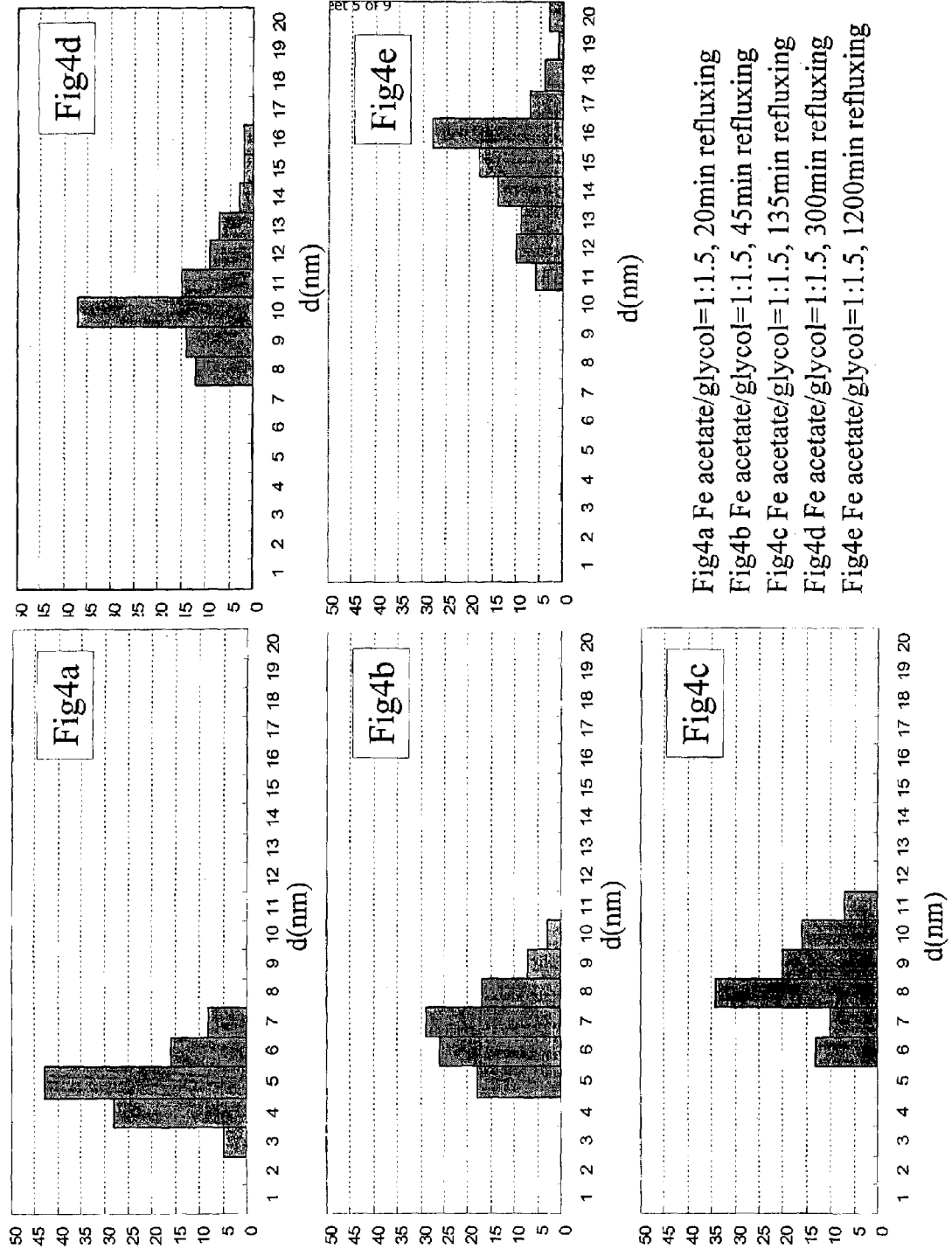

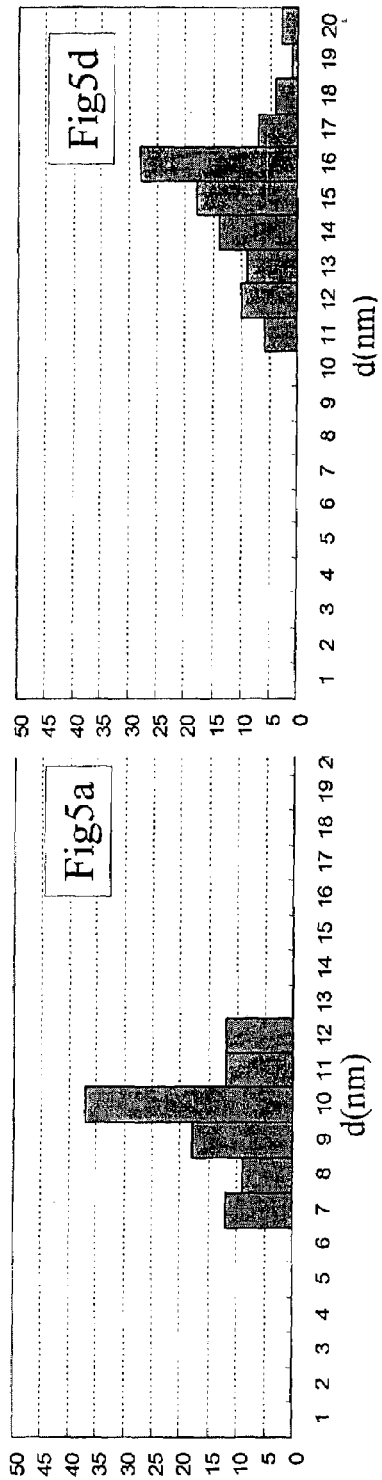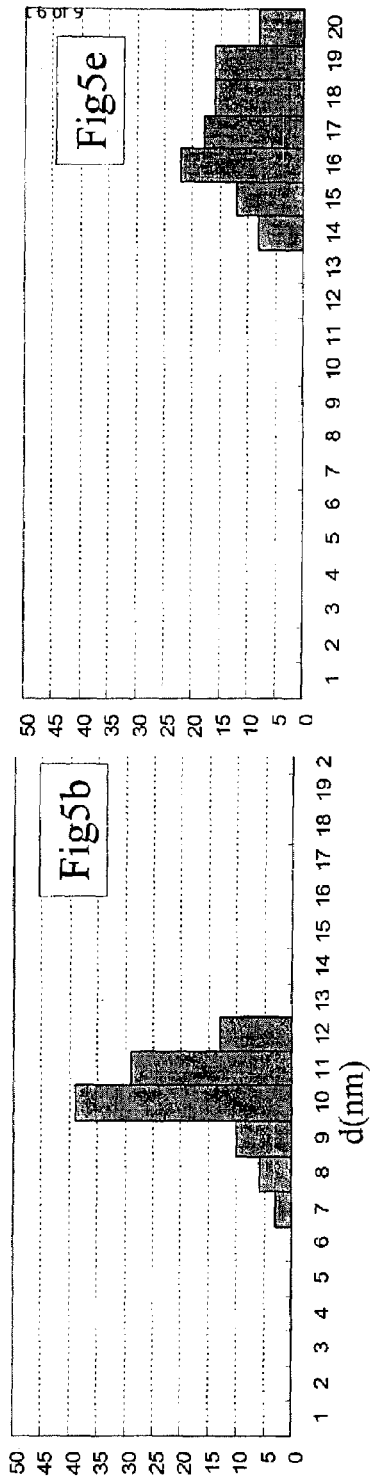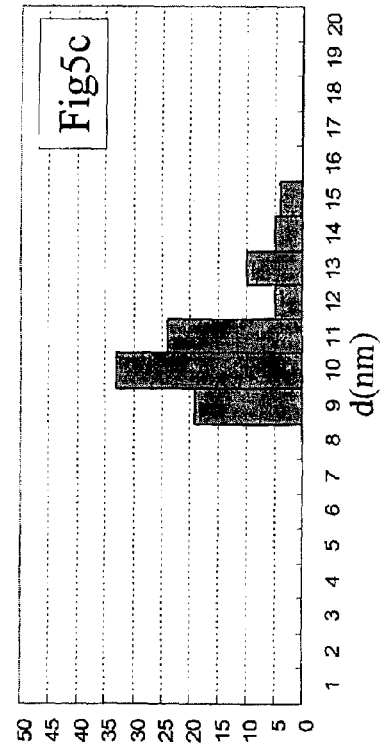
Fig 5a Fe acetate/glycol=1:45, 20 hrs refluxing
Fig 5b Fe acetate/glycol=1:14, 20 hrs refluxing
Fig 5c Fe acetate/glycol=1:3, 20 hrs refluxing
Fig 5d Fe acetate/glycol=1:1.5, 20 hrs refluxing
Fig 5e Fe acetate/glycol=2:1, 20 hrs refluxing a) — SWNTs grown with ~5nm Fe nanoparticles supported by $Al_2O_3$ powders
b) — SWNTs grown with ~8nm Fe nanoparticles supported by $Al_2O_3$ powders
c) — SWNTs grown with ~10nm Fe nanoparticles supported by $Al_2O_3$ powders

US 7,214,361 B2

METHOD FOR SYNTHESIS OF CARBON NANOTUBES

RELATED APPLICATIONS

This application is related to co-pending U.S. patent application Ser. No. 10/304,342, filed Nov. 26, 2002 and U.S. patent application Ser. No. 10/304,316, filed Nov. 26, 2002 all of which are incorporated by reference herein in their entirety.

FIELD OF INVENTION

The present invention relates to a method for the synthesis of carbon nanotubes.

BACKGROUND

Single-walled carbon nanotubes are a material with many potential applications. For example, the properties of some carbon nanotubes may allow for creation of capacitors with capacitance versus size characteristics that are not readily attainable with traditional materials. More generally, single-walled nanotubes (SWNTs) made of carbon may exhibit either metallic or semiconducting properties, depending on their diameter and crystalline structure.

One current technique for synthesis of carbon nanotubes involves chemical vapor deposition (CVD) on a growth substrate containing metal nanoparticles. Unfortunately, current CVD methods of carbon nanotube synthesis suffer from a lack of control over the size and shape of the nanotubes. Some methods of carbon nanotube production lead to mixtures of single-walled nanotubes and multi-walled nanotubes. Other methods result in production of nanotubes with variations in nanotube shape and size, leading to a lack of control over the properties of the resulting nanotubes.

Obtaining the metal nanoparticles for use in the growth substrate also poses difficulties. Some current techniques may produce particles of a desirable size, but with poor crystallinity or an unpredictable distribution of phases within the nanoparticles. Other techniques suffer from an inability to control the distribution of sizes around a desired nanoparticle size. Still other nanoparticle synthesis techniques require specialized equipment, long processing times, or expensive specialty chemicals.

In order to realize the full potential of carbon nanotubes as an industrial material, what is needed is a method of synthesis for carbon nanotubes capable of producing single-walled nanotubes while maintaining control over the size and properties of the individual nanotubes.

SUMMARY

The present invention provides a method for the synthesis of carbon nanotubes via chemical vapor deposition (CVD) using metal nanoparticles as a growth catalyst. Metal nanoparticles of a controlled size distribution are dispersed in a passivating solvent along with a powdered oxide. The mixture of metal nanoparticles and powdered oxide is then extracted from the passivating solvent and annealed under an inert atmosphere. Nanotubes are then grown by exposing the nanoparticles to a flow of a carbon precursor gas at a temperature in the vicinity of 680° C. to 900° C. Control over the size of the carbon nanotubes is achieved in part by controlling the size of the metal nanoparticles in the growth catalyst.

BRIEF DESCRIPTION OF THE DRAWINGS

FIG. 1 shows an example of an apparatus for carrying out an embodiment of the present invention.

FIG. 2 shows an example of an apparatus for use in preparing metal nanoparticles according to an embodiment of the present invention.

FIGS. 4a–4e show histograms of metal nanoparticle sizes for metal nanoparticles produced according to an embodiment of the present invention.

FIGS. 5a–5e show histograms of metal nanoparticle sizes for metal nanoparticles produced according to another embodiment of the present invention.

DETAILED DESCRIPTION OF THE EMBODIMENTS

Figure 3A:
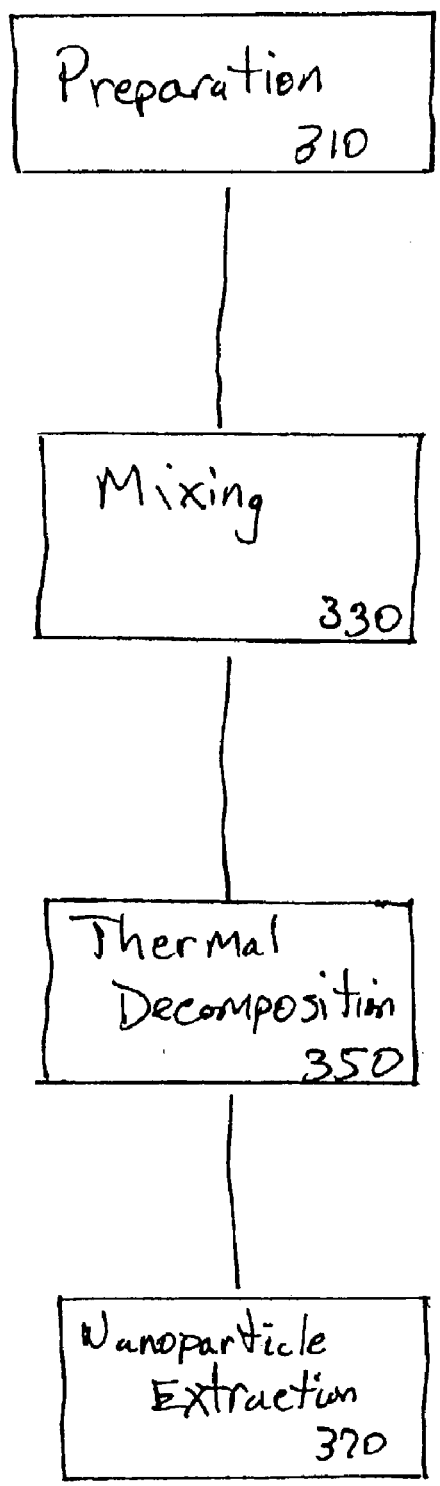
FIG. 3a depicts a flow chart for a method of producing metal nanoparticles according to an embodiment of the present invention.

FIGS. 1 and 2 depict possible apparatuses for synthesizing metal nanoparticles for use in carrying out the present invention. While FIGS. 1 and 2 depict possible equipment selections, those skilled in the art will recognize that any suitable mixing apparatus and reflux apparatus may be used for synthesis of the nanoparticles. Although no specialized equipment is required to carry out the present invention, the components used should be suitable for use with the various embodiments of this invention. Thus, the mixing and reflux equipment should be safe for use with organic solvents and should be safe for use at the reflux temperature of the thermal decomposition reaction.

The various embodiments of this invention make use of metal nanoparticles having a controlled size distribution as a catalyst material for facilitating the growth of carbon nanotubes by a CVD process. The metal nanoparticles having a controlled size distribution may be obtained by any suitable method. In preferred embodiments, the metal nanoparticles may be synthesized according to the following method involving thermal decomposition of a metal salt in a passivating solvent.

In FIG. 1, a mixing apparatus is generally shown at 100. Reaction vessel 130 may be any suitable vessel for holding a metal salt and passivating solvent mixture during mixing and refluxing steps. In an embodiment, reaction vessel 130 may be a 500 ml glass or Pyrex™ Erlenmeyer flask. Other styles of reaction vessel, such as round-bottom flasks, may also be used as long as the reaction vessel is compatible for use with the mixing and reflux apparatuses. In the embodiment shown in FIG. 1, reaction vessel 130 is attached to sonicator 150. Sonicator 150 may be used to mix the contents of reaction vessel 130. A suitable sonicator is the FS60 available from Fisher Scientific of Pittsburgh, Pa. In other embodiments, the contents of reaction vessel 130 may be mixed by other methods, such as by using a standard laboratory stirrer or mixer. Other methods of mixing the solution will be apparent to those skilled in the art. Reaction vessel 130 may also be heated during mixing by a heat source 170. In FIG. 1, heat source 170 is shown as a hot plate, but other suitable means of heating may be used, such as a heating mantle or a Bunsen burner.

FIG. 2 depicts a reflux apparatus 200. In this apparatus, reaction vessel 130 is connected to a condenser 210. Condenser 210 is composed of a tube 220 that is surrounded by a condenser jacket 230. During a reflux operation, water or another coolant is circulated through condenser jacket 230 while heat is applied to reaction vessel 130. The coolant may be circulated by connecting the inlet of the condenser jacket to a water faucet, by circulating a coolant through a closed loop via a pump, or by any other suitable means. During reflux, evaporated passivating solvent rising from reaction vessel 130 will be cooled as it passes through tube 220. This will cause the passivating solvent to condense and fall back into reaction vessel 130. Note that the method of connecting condenser 210 with reaction vessel 130 should form a seal with the top of reaction vessel so that gases rising from the reaction vessel must pass through tube 220. This can be accomplished, for example, by connecting condenser 210 to the reaction vessel 130 via a stopper 205. The end of tube 220 is passed through a hole in stopper 205. As in FIG. 1, heat source 170 may be a hot plate, heating mantle, Bunsen burner, or any other suitable heating apparatus as will be apparent to those skilled in the art.

In other embodiments of the invention, both mixing and reflux may be accomplished using a single apparatus. For example, stopper 205 may have a second opening to allow passage of the shaft of the stirring rod from a laboratory mixer or stirrer. In these embodiments, once the metal salt and passivating solvent have been added to reaction vessel 130, the reaction vessel may be connected to the dual mixing and refluxing apparatus. Still other embodiments of how to mix and reflux the contents of a reaction vessel will be apparent to those skilled in the art.

FIG. 3a provides a flow diagram of the steps for preparing metal nanoparticles according to an embodiment of the present invention. FIG. 3a begins with preparing 310 a mixture by adding a passivating solvent and metal salt to the reaction vessel. Note that depending on the choice of metal salt and passivating solvent, this mixture could be in the form of a solution, suspension, or dispersion. In an embodiment, the passivating solvent is an ether. In another embodiment, the passivating solvent is a glycol ether. In still another embodiment, the passivating solvent is 2-(2-butoxyethoxy) ethanol, $H(OCH_2CH_2)_2O(CH_2)_3CH_3$, which will be referred to below using the common name dietheylene glycol mono-n-butyl ether.

In an embodiment, the metal salt will be a metal acetate. Suitable metal acetates include transition metal acetates, such as iron acetate, $Fe(OOCCH_3)_2$, nickel acetate, $Ni(OOCCH_3)_2$, or palladium acetate, $Pd(OOCCH_3)_2$. Other metal acetates that may be used include molybdenum. In still other embodiments, the metal salt may be a metal salt selected so that the melting point of the metal salt is lower than the boiling point of the passivating salt.

As will be discussed below, the relative amounts of metal salt and passivating solvent are factors in controlling the size of nanoparticles produced. A wide range of molar ratios, here referring to total moles of metal salt per mole of passivating solvent, may be used for forming the metal nanoparticles. Typical molar ratios of metal salt to passivating solvent include ratios as low as about 0.0222 (1:45), or as high as about 2.0 (2:1). In an embodiment involving iron acetate and diethylene glycol mono-n-butyl ether, typical reactant amounts for iron acetate range from about $5.75 \times 10^{-5}$ to about $1.73 \times 10^{-3}$ moles (10–300 mg). Typical amounts of diethylene glycol mono-n-butyl ether range from about $3 \times 10^{-4}$ to about $3 \times 10^{-3}$ moles (50–500 ml).

In another embodiment, more than one metal salt may be added to the reaction vessel in order to form metal nanoparticles composed of two or more metals. In such an embodiment, the relative amounts of each metal salt used will be a factor in controlling the composition of the resulting metal nanoparticles. In an embodiment involving iron acetate and nickel acetate as the metal salts, the molar ratio of iron acetate to nickel acetate is 1:2. In other embodiments, the molar ratio of a first metal salt relative to a second metal salt may be between about 1:1 and about 10:1. Those skilled in the art will recognize that other combinations of metal salts and other molar ratios of a first metal salt relative to a second metal salt may be used in order to synthesize metal nanoparticles with various compositions.

Figure 3B:
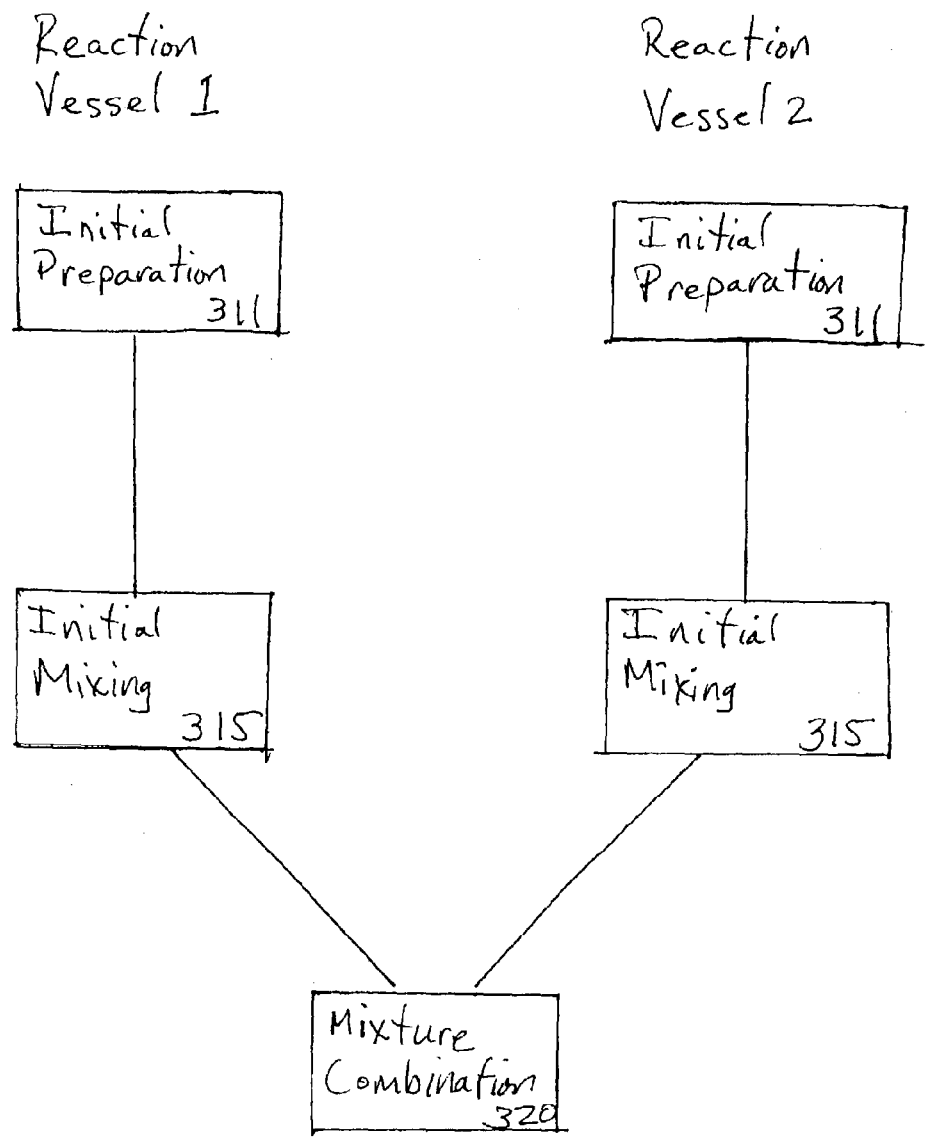
FIG. 3b depicts a flow chart for a method of producing metal nanoparticles according to another embodiment of the present invention.

In still another embodiment, preparing a mixture 310 may involve a series of steps, such as those shown in the flow diagram in FIG. 3b. FIG. 3b begins with initially preparing 311 two or more mixtures of metal salt and passivating solvent in separate reaction vessels. In an embodiment, each mixture is formed by adding one metal salt to a passivating solvent. In preferred embodiments, the same passivating solvent is used to form each of the metal salt and passivating solvent mixtures. After preparing the passivating solvent and metal salt mixtures in the separate reaction vessels, the contents of each of the reaction vessels are mixed during initial mixing 315. During initial mixing 315, the contents of the reaction vessels are mixed to create substantially homogeneous mixtures. The homogenous mixtures may be in the forms of mixtures, solutions, suspensions, or dispersions. In an embodiment, the contents of the reaction vessels are sonicated for 2 hours. In another embodiment, the contents of the reaction vessel may be mixed using a standard laboratory stirrer or mixer. Other methods for creating the homogeneous mixture or dispersion will be apparent to those skilled in the art. The contents of the reaction vessel may be heated during initial mixing 315 in order to reduce the required mixing time or to improve homogenization of the mixture. In an embodiment, the contents of the reaction vessels are sonicated at a temperature of 80° C. After first mixing 315, the homogenous mixtures are combined 320 into a single reaction vessel to create a mixture containing all of the metal salts and passivating solvents.

Returning now to FIG. 3a, after preparing 310 a mixture containing all metal salts and passivating solvents in a single reaction vessel, the contents of the reaction vessel are mixed during mixing 330. During mixing 330, the contents of the reaction vessel are mixed to create a substantially homogeneous mixture of metal salt in the passivating solvent. The homogenous mixture may be in the form of a mixture, solution, suspension, or dispersion. In an embodiment, the contents of the reaction vessel are mixed by sonication. In another embodiment, the contents of the reaction vessel may be mixed using a standard laboratory stirrer or mixer. The contents of the reaction vessel may also be heated during mixing 330 in order to reduce the required sonication or mixing time. In an embodiment, the contents of the reaction vessel are sonicated at 80° C. for two hours and then both sonicated and mixed with a conventional laboratory stirrer at 80° C. for 30 minutes. In another embodiment, the contents of the reaction vessel are sonicated at room temperature for between 0.5 and 2.5 hours. Other methods for creating the homogeneous mixture will be apparent to those skilled in the art.

After forming a homogenous mixture, metal nanoparticles are formed during the thermal decomposition 350. The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner. Other methods of increasing the temperature of the contents of the reaction vessel to above the melting point of the metal salt will be apparent to those skilled in the art. The length of the thermal decomposition 350 will be dictated by the desired size of the metal nanoparticles, as will be discussed below. Typical reaction times may range from about 20 minutes to about 2400 minutes, depending on the desired nanoparticle size. The thermal decomposition reaction is stopped at the desired time by reducing the temperature of the contents of the reaction vessel to a temperature below the melting point of the metal salt. In an embodiment, the reaction is stopped by simply removing or turning off the heat source and allowing the reaction vessel to cool. In another embodiment, the reaction may be quenched by placing the reaction vessel in a bath. Note that in this latter embodiment, the temperature of the quench bath may be above room temperature in order to prevent damage to the reaction vessel.

In a preferred embodiment of the invention, the contents of the reaction vessel are refluxed during the heating step. In this embodiment, a standard reflux apparatus may be used, such as the one depicted in FIG. 2. During thermal decomposition 350, water (or another coolant) is passed through condensing jacket 230. Vapors rising from the passivating solvent are cooled as they pass through tube 220, leading to condensation of the passivating solvent vapors. The condensed passivating solvent then falls back into the reaction vessel. This recondensation prevents any significant loss of volume of the passivating solvent during the thermal decomposition reaction. Thus, the relative ratio of metal to passivating solvent stays substantially constant throughout the reaction. Those skilled in the art will recognize that while refluxing is a preferred method for carrying out the thermal decomposition reaction, it is not necessary for nanoparticle formation. As long as the temperature of the homogeneous dispersion is raised to above the melting point of the metal salt, the desired thermal decomposition reaction will take place and lead to formation of metal nanoparticles.

The size and distribution of metal nanoparticles produced by the present invention may be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

FIGS. 4a–4e and 5a–5e depict histograms of particle size distributions for iron nanoparticles created under several conditions. The particle size distributions represent iron nanoparticles made by mixing iron acetate and diethylene glycol mono-n-butyl ether in a reaction vessel to form a homogeneous mixture. The contents of the reaction vessel were then refluxed at the boiling point of diethylene glycol mono-n-butyl ether (231° C.) for the time period specified in each figure. The figures also note the concentration of the metal acetate in the passivating solvent. The concentrations are specified as ratios of milligrams of iron acetate per milliliter of passivating solvent, but note that these ratios are coincidentally similar to the molar ratios, due to the similar molecular weights of iron acetate and diethylene glycol mono-n-butyl ether (173.84 g/mol versus 162.23 g/mol) and the fact that the density of diethylene glycol mono-n-butyl ether is close to 1.

Two factors used to control the size distribution of the nanoparticles were the concentration of metal in the passivating solvent and the length of time the reaction was allowed to proceed at the thermal decomposition temperature. FIGS. 4a–4e depict histograms from a series of reactions where the ratio of milligrams of iron acetate to milliliters of diethylene glycol mono-n-butyl ether was held constant at 1:1.5 while varying the length of the reflux at the reaction temperature. For comparison purposes, the histograms have been normalized so that the area under the histogram bars in each figure equals 100. FIG. 4a depicts results from the shortest reaction time of 20 minutes at the boiling point of diethylene glycol mono-n-butyl ether (231° C.). As shown in FIG. 4a, 20 minutes of thermal decomposition reaction time leads to a narrow distribution of particle sizes centered on 5 nm. FIGS. 4b–4e depict similar histograms for increasing amounts of reaction time. As seen in the figures, increasing the reaction time leads to an increase in the average particle size. Additionally, FIGS. 4d and 4e indicate that at the longest reflux times (300 minutes and 1200 minutes), the width of the particle size distribution also increases.

FIGS. 5a–5e provide additional results from thermal decomposition reactions with varying concentrations at a constant reaction time of 1200 minutes, or 20 hours. Note that even the lowest ratio of iron acetate to passivating solvent results in an average particle size of 10 nm. These results indicate that both low concentrations and short reaction times are required to achieve the smallest particle sizes.

After forming the metal nanoparticles by thermal decomposition 350, the metal nanoparticles are removed from the passivating solvent to be used as a growth catalyst for forming carbon nanotubes. In an embodiment, this is achieved via a secondary dispersion 370 and extraction 390. In an embodiment, secondary dispersion 370 begins by introducing particles of a powdered oxide, such as aluminum oxide ($Al_2O_3$) or silica ($SiO_2$), into the reaction vessel after the thermal decomposition reaction. A suitable $Al_2O_3$ powder with 1–2 μm particle size and having a surface area of 300–500 $m^2$/g is available from Alfa Aesar of Ward Hill, Mass. In an embodiment, enough powdered oxide is added to achieve a desired weight ratio between the powdered oxide and the initial amount of metal used to form the metal nanoparticles. In an embodiment, this weight ratio is between roughly 10:1 and roughly 15:1. For example, in an embodiment involving 100 mg of iron acetate as the starting material, roughly 32 mg of the starting material corresponds to iron. Thus, roughly 320 to 480 mg of powdered oxide would be introduced into the solution. Other materials suitable for use as the powdered oxide will be apparent to those skilled in the art.

After adding the powdered oxide to the metal nanoparticle/passivating solvent mixture, the mixture is mixed to again form a homogenous mixture or dispersion of metal nanoparticles and powdered oxide in the passivating solvent. In an embodiment, an apparatus similar to the apparatus in FIG. 1 is used. Thus, the homogenous mixture or dispersion may be formed using sonicator 150, a standard laboratory stirrer or mixer, or any other suitable method. In another embodiment, the mixture may be both sonicated and mixed using a conventional laboratory mixer or stirrer to form the homogenous mixture or dispersion. In an embodiment, the mixture of metal nanoparticles, powdered oxide, and passivating solvent is first sonicated at roughly 80° C. for 2 hours. The mixture is then both sonicated and mixed with a laboratory stirrer at 80° C. for 30 minutes.

After secondary dispersion 370, the dispersed metal nanoparticles and powdered oxide are extracted from the passivating solvent. In an embodiment, extraction 390 includes heating the homogenized mixture to a temperature where the passivating solvent has a significant vapor pressure. This temperature is maintained until the passivating solvent evaporates, leaving behind the metal nanoparticles deposited in the pores of the $Al_2O_3$. In an embodiment involving diethylene glycol mono-n-butyl ether as the passivating solvent, the homogenous dispersion is heated to 231° C., the boiling point of the passivating solvent, under an $N_2$ flow. The temperature and $N_2$ flow are maintained until the passivating solvent is completely evaporated. After evaporating the passivating solvent, the powdered oxide and metal nanoparticles are left behind on the walls of the reaction vessel as a film or residue. In embodiments involving $Al_2O_3$ as the powdered oxide, the film will be black.

Without being bound by any particular theory, it is believed that the powdered oxide serves two functions during the above extraction process. Because of the porous, high surface area nature of the powdered oxide, the metal nanoparticles will settle in the pores of the powdered oxide during secondary dispersion 370. Settling in the pores of the powdered oxide physically separates the metal nanoparticles, thus preventing agglomeration of the metal nanoparticles during extraction 390. This effect is complemented by the amount of powdered oxide used. As noted above, in an embodiment the weight ratio of metal nanoparticles to powdered oxide is between about 1:10 and 1:15. The relatively larger amount of powdered oxide in effect serves to further separate or 'dilute' the metal nanoparticles as the passivating solvent is removed.

It should be noted that although the above processes describe the production of metal nanoparticles, some oxidation of the metal nanoparticles may occur after extraction from the passivating solvent. Metal nanoparticles are highly reactive, in part due to their high surface area to volume ratio. When certain types of metal nanoparticles are exposed to an environment containing oxygen, especially at temperatures above room temperature, the metal nanoparticles will have a tendency to oxidize. For example, iron nanoparticles extracted from a passivating solvent by heating the passivating solvent to 230° C. in the presence of oxygen will be at least partially converted to iron oxide nanoparticles. Thus, even though the present invention relates to the synthesis of metal nanoparticles, it is understood that the metal nanoparticles may subsequently become partially oxidized after the completion of the thermal decomposition reaction.

The methods described above may be used to produce metal nanoparticles with a controlled size distribution. In an embodiment, the metal nanoparticles comprise nanoparticles between roughly 3 nm and roughly 7 nm in size, such as the distribution depicted in FIG. 4a. In another embodiment, the metal nanoparticles comprise nanoparticles between roughly 5 nm and roughly 10 nm in size, such as the distribution depicted in FIG. 4b. In still another embodiment, the metal nanoparticles comprise nanoparticles between roughly 8 nm and roughly 16 nm in size, such as the distribution depicted in FIG. 4d.

Figure 6:
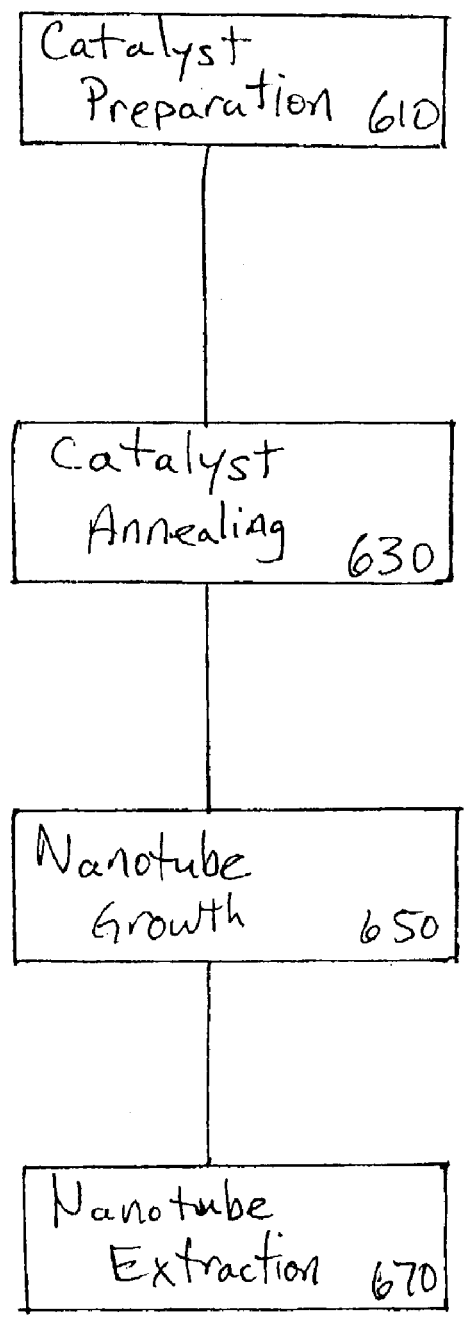
FIG. 6 depicts a flow chart for a method of producing carbon nanotubes according to an embodiment of the present invention.

Having synthesized metal nanoparticles with a controlled size distribution, the metal nanoparticles are now prepared for use as a growth substrate for carbon nanotubes. FIG. 6 depicts a flow chart for using metal nanoparticles to grow carbon nanotubes according to an embodiment of the present invention. During catalyst preparation 610, the metal nanoparticle and powdered oxide film is removed from the reaction vessel and ground to create a fine powder. The grinding step increases the available surface area of the mixture. In an embodiment, the mixture is ground with a mortar and pestle. Other methods of increasing the surface area of the mixture will be apparent to those of skill in the art.

In other embodiments, catalyst preparation 610 comprises obtaining a previously prepared mixture of metal nanoparticles and powdered oxide. In still other embodiments, catalyst preparation 610 comprises adding previously prepared metal nanoparticles and a powdered oxide to a suitable volume of passivating solvent. The metal nanoparticles and powdered oxide are then homogenously dispersed, extracted from the passivating solvent, and processed to increase the effective surface area as described above. Other methods for preparing the metal nanoparticle and powdered oxide mixture will be apparent to those skilled in the art.

Figure 7:
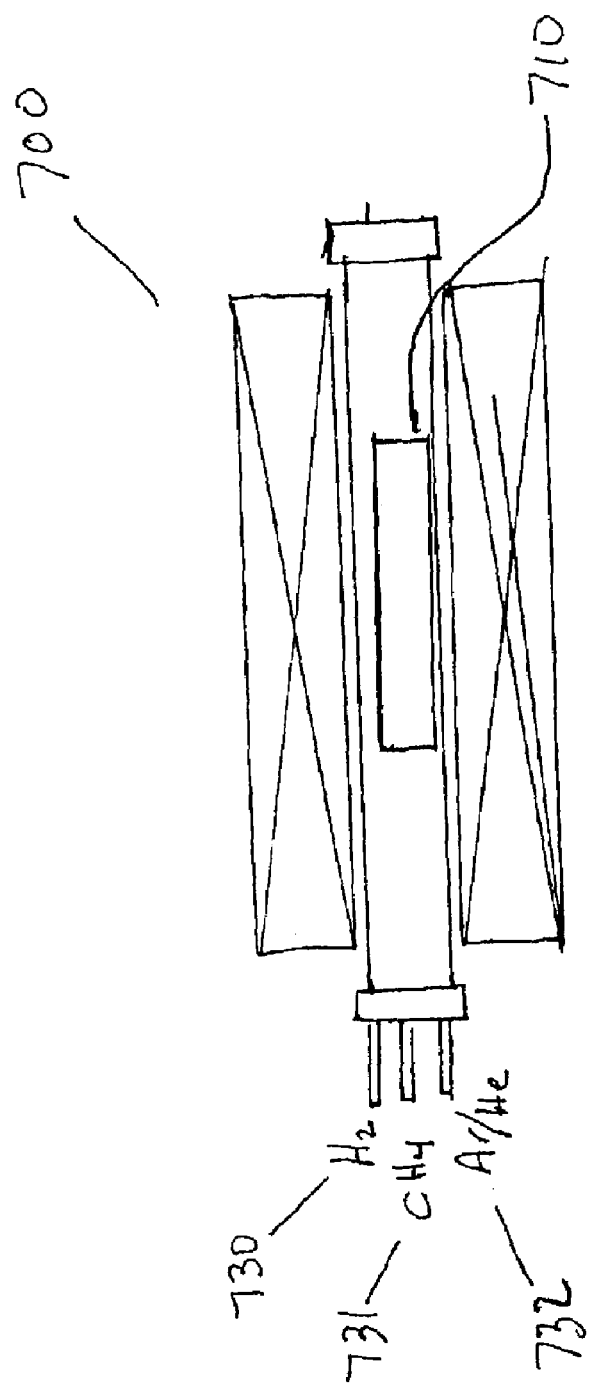
FIG. 7 shows an example of an apparatus for carrying out an embodiment of the present invention.

After preparing the metal nanoparticle and powdered oxide mixture in catalyst preparation 610, the mixture is transferred to a quartz boat or other conventional high temperature carrier for annealing in a furnace during catalyst annealing 630. FIG. 7 schematically depicts a cutaway view of an apparatus that may be used in carrying out annealing and chemical vapor deposition according to the present invention. In FIG. 7, furnace 700 may be any conventional laboratory furnace capable of providing flows of inert and reagent gases during heating. For example, the Carbolite model TZF 12/65/550 is a suitable horizontal 3-zone furnace for carrying out some embodiments of the present invention. In FIG. 7, quartz tube 710 is placed inside furnace 700. In an embodiment, quartz tube 710 is 100 cm long and 5 cm in diameter. During operation, a quartz boat (not shown) containing the material to be heated is placed inside of quartz tube 710. Gas inlets 730, 731, and 732 provide flows of inert and reagent gases during operation of the furnace.

In an embodiment, catalyst annealing 630 comprises annealing the mixture of the powdered oxide and metal nanoparticles at a temperature between roughly 400° C. and roughly 550° C. under a flow of 100 standard cubic centimeters per minute (sccm) composed of a reducing reagent, such as hydrogen ($H_2$), and an inert gas, such as helium (He). In an embodiment, the gas flow is composed of 10% $H_2$ and 90% He. In an embodiment, the annealing step lasts for roughly 1–2 hours. It is believed that exposing the metal nanoparticle and powdered oxide mixture to a reducing atmosphere during annealing will at least partially reverse any oxidation of the metal nanoparticles that may have occurred. Note that the reducing atmosphere provided by the $H_2$/He mix is preferred, but it is not necessary for nanotube production. In another embodiment, the mixture is annealed at a temperature between roughly 500° C. and 550° C. under a flow of 100 sccm of argon (Ar). Catalyst annealing 630 may also optionally include a second annealing process. In an embodiment involving this optional second annealing process, after the first annealing process the mixture of metal nanoparticles and powdered oxide is ground again with a mortar and pestle. The mixture is then returned to the furnace for the second annealing.

After catalyst annealing 630, the mixture of metal nanoparticles and powdered oxide is used as a growth catalyst during nanotube growth 650 for formation of carbon nanotubes by chemical vapor deposition. In an embodiment, nanotube growth 650 begins by heating the metal nanoparticle and powdered oxide mixture in a furnace to a deposition temperature between roughly 680° C. and roughly 900° C. under a gas flow of 100 sccm of Ar. In another embodiment, the deposition temperature is selected to be between roughly 800° C. and roughly 900° C. Once the desired deposition temperature is achieved, the flow of Ar gas is increased to between about 200 sccm and about 400 sccm. At this time a carbon precursor gas flow of between about 30 sccm and 50 sccm is also introduced into the furnace. In an embodiment, the carbon precursor gas is methane ($CH_4$). Introduction of the carbon precursor gas flow begins the deposition process for the formation of carbon nanotubes. In an embodiment, the deposition temperature, inert gas flow, and carbon gas flow are maintained for between about 30 minutes and about 60 minutes. After maintaining the deposition temperature and gas flows for the desired period of time, the flow of the carbon precursor gas is turned off and the furnace is allowed to cool to room temperature under the Ar flow. The amount of time required for this cooling step will depend on the furnace used. For example, for the furnace described above this cooling step takes approximately 4 hours. In another embodiment, ethylene ($C_2H_4$) may be used instead of $CH_4$ as the carbon precursor gas. When using ethylene, deposition temperatures toward the lower end of the range should be used.

The end product of nanotube growth 650 is a black soot containing amorphous carbon, powdered oxide, metal nanoparticles, and carbon nanotubes. Depending on the desired use of the carbon nanotubes, some or all of the other materials in the end product may need to be removed from this mixture during nanotube extraction 670. In an embodiment, the carbon nanotubes can be extracted from the other materials using a series of selective cleaning steps. First, the mixture of powdered oxide, amorphous carbon, metal nanoparticles, and carbon nanotubes is washed in a concentrated hydrogen fluoride solution (HF). In an embodiment, the mixture is immersed in 98% HF for 1 minute at 25° C. If the powdered oxide is $Al_2O_3$ or $SiO_2$, the powdered oxide will dissolve in the HF without affecting the other components of the mixture. Note that the mixture can be transferred to an HF compatible container prior to this step, as 98% HF will etch quartz, and thus may damage a quartz boat. After dissolution of the powdered oxide, the mixture is removed from the HF solution and rinsed with water to remove excess HF.

The mixture now contains only amorphous carbon, metal nanoparticles, and carbon nanotubes. In an embodiment, the amorphous carbon is removed next by returning the mixture to the furnace and selectively oxidizing the amorphous carbon, such as by a temperature programmed oxidation method. Temperature programmed oxidation is used to identify the appropriate temperature for removing the amorphous carbon due to the fact that the thermal oxidation characteristics of the mixtures vary between successive nanotube formation processes. In an embodiment, the temperature programmed oxidation begins by heating a small portion of the amorphous carbon, metal nanoparticle, and carbon nanotube mixture in the furnace in the presence of dry air. As the temperature in the furnace rises, the desorption of species from the mixture is monitored. The first desorption peak should correspond to the volitalization of amorphous carbon. The remainder of the mixture is then introduced into the furnace and heated in dry air at the temperature corresponding to the first desorption peak.

After removing the amorphous carbon, the remaining mixture of metal nanoparticles and carbon nanotubes is allowed to cool to room temperature. In embodiments involving iron or nickel nanoparticles, the mixture is then washed in a strong acid such as hydrochloric acid, nitric acid, or aqua regia to dissolve the metal nanoparticles. In an embodiment, the mixture of metal nanoparticles and carbon nanotubes is immersed in 6 M HCl. In other embodiments, the acid used to remove the metal nanoparticles may vary depending on the composition of the nanoparticles. After this final acid wash, the carbon nanotubes are rinsed with water to remove any remaining acid, leaving the carbon nanotubes ready for use.

Production of carbon nanotubes can be verified by use of Raman spectroscopy or transmission electron microscopy (TEM). TEM is a useful analysis tool for identifying the presence of individual nanotubes and for determining their physical dimensions, such as length or diameter. Raman spectroscopy provides only an average measure of nanotube size, but it is also capable of identifying the type of nanotubes produced in terms of metallic or semiconducting properties.

Figure 8:
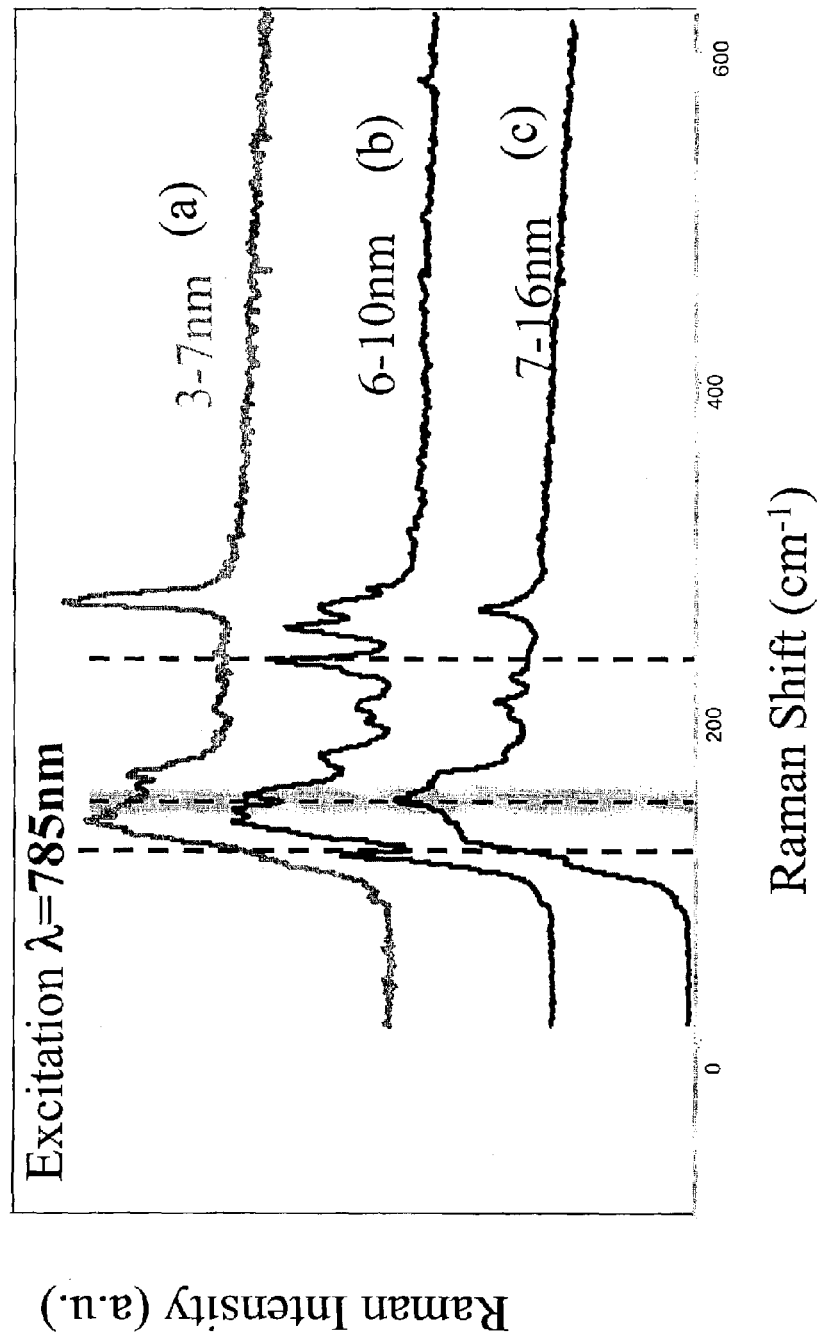
FIG. 8 depicts Raman spectra of carbon nanotubes produced according to an embodiment of the present invention.

FIG. 8 provides an example of Raman spectra at an excitation frequency of 785 nm for carbon nanotubes produced according to an embodiment of the present invention. The three spectra represent carbon nanotubes grown on iron nanoparticle substrates with various nanoparticle size distributions. In a Raman spectrum of carbon nanotubes, the 'breathing' modes of the nanotubes are visible in the range of 100 to 300 $cm^{-1}$. Within the breathing modes, the location of the Raman scattering peaks can be used to identify average nanotube size according to the formula $$d=224/(\omega-12)$$

where d is the diameter of the nanotube in nanometers, and $\omega$ is the wavenumber of the Raman excitation in $cm^{-1}$. As noted above, the spectra presented in FIG. 8 provide an example of Raman spectra for use in identifying carbon nanotubes. Because a given excitation frequency will only interact with certain sizes of nanotubes, full characterization of a carbon nanotube sample would require running multiple Raman spectra at different excitation frequencies.

Depending on the size of the metal nanoparticles, carbon nanotubes may be grown with diameters ranging from roughly 0.7 nm to greater than 1.7 nm. Additionally, the chirality of the nanotubes also depends on the initial nanoparticle size. Control over the size and chirality of the resulting nanotubes is important for controlling whether the nanotubes have metallic or semiconducting characteristics. In FIG. 8, dotted lines have been included to indicate potential breathing mode peak locations in each of the three spectra. Note that all three of the spectra exhibit a nanotube breathing mode peak at approximately 175 $cm^{-1}$. It is believed that this common peak represents nanotubes grown on nanoparticles of roughly 7 nm in size, a nanoparticle size common to all three of the spectra. This provides an example of how control of nanoparticle size can be used to select for certain types of nanotubes.

While the invention has been particularly shown and described with reference to a preferred embodiment and various alternate embodiments, it will be understood by persons skilled in the relevant art that various changes in form and details can be made therein without departing from the spirit and scope of the invention.

We claim:

1. A method for producing carbon nanotubes, comprising the steps of:

providing a mixture consisting essentially of one or more metal salts and a passivating solvent, wherein the passivating solvent is 2-(2-butoxyethoxy)ethanol;

mixing the mixture of said one or more metal salts and said passivating solvent;

heating the mixture of said one or more metal salts and said passivating solvent to a temperature above the melting point of at least one of said one or more metal salts and maintaining the temperature above the melting point of at least one of said one or more metal salts to form metal nanoparticles;

adding a powdered oxide to the mixture of metal nanoparticles and passivating solvent;

mixing the mixture of metal nanoparticles, powdered oxide, and passivating solvent;

extracting the metal nanoparticles and powdered oxide from the passivating solvent;

annealing the metal nanoparticles and powdered oxide;

heating the metal nanoparticles and powdered oxide to a temperature less than a deposition temperature; and exposing the metal nanoparticles to a carbon precursor gas while maintaining the temperature above the deposition temperature to form carbon nanotubes.

2. The method of claim 1, wherein annealing the mixture of metal nanoparticles and powdered oxide comprises the step of heating the mixture of metal nanoparticles and powdered oxide to between about 400° C. and about 550° C. in the presence of a gas flow composed of 10% $H_2$ and 90% He.

3. The method of claim 1, wherein annealing the mixture of metal nanoparticles and powdered oxide comprises the step of heating the mixture of metal nanoparticles and powdered oxide to between about 500° C. and about 550° C. in the presence of an inert gas flow.

4. The method of claim 1, wherein said one or more metal salts are transition metal acetates.

5. The method of claim 1, wherein at least one of said one or more metal salts is a substance selected from the group consisting of iron acetate, palladium acetate, nickel acetate, and molybdenum acetate.

6. The method of claim 1, wherein the powdered oxide is selected from the group consisting of aluminum oxide and silicon oxide.

7. The method of claim 1, wherein the deposition temperature is between about 680° C. and about 900° C.

8. The method of claim 1, wherein heating the mixture of said one or more metal salts and said passivating solvent comprises the step of refluxing the mixture of said one or more metal salts and said passivating solvent.

9. The method of claim 8, wherein the mixture of said one or more metal salts and said passivating solvent is refluxed at the boiling point of said passivating solvent.

10. The method of claim 1, wherein the molar ratio of the mixture of said one or more metal salts and said passivating solvent is between about 2:1 and about 1:45.

11. The method of claim 1, wherein mixing the mixture of said one or more metal salts and said passivating solvent comprises the step of mixing the mixture of said one or more metal salts and said passivating solvent to form a homogenous mixture.

12. The method of claim 1, wherein mixing the mixture of metal nanoparticles, powdered oxide, and passivating solvent comprises the step of mixing the mixture of metal nanoparticles, powdered oxide, and passivating solvent to form a homogenous mixture.

13. The method of claim 1, wherein the molar ratio of metal to powdered oxide is between about 1:10 and about 1:15.

14. The method of claim 1, wherein the temperature of the mixture of said one or more metal salts and said passivating solvent is maintained at a temperature above the melting point of at least one of said one or more metal salts for a time between about 20 minutes and about 2400 minutes.

15. The method of claim 1, wherein the carbon precursor gas is methane.

16. The method of claim 1, further comprising the step of extracting the carbon nanotubes from the products formed during said exposing step.

17. The method of claim 1, wherein said exposing step comprises exposing the metal nanoparticles to the carbon precursor gas for a time between about 30 minutes and about 60 minutes.

18. A method for producing carbon nanotubes, comprising the steps of:

providing a mixture comprising a metal acetate and a passivating solvent, wherein the passivating solvent is 2-(2-butoxyethoxy)ethanol;

mixing the mixture of said metal acetate and said passivating solvent;

refluxing the mixture of said metal acetate and said passivating solvent to form metal nanoparticles;

extracting the metal nanoparticles from said passivating solvent to form a growth catalyst;

heating the growth catalyst to a temperature less than a deposition temperature; and exposing the growth catalyst to a carbon precursor gas while maintaining the temperature above the deposition temperature to form carbon nanotubes.

19. The method of claim 18, wherein the growth catalyst comprises metal nanoparticles and a powdered oxide.

20. The method of claim 18, wherein the metal acetate is a substance selected from the group consisting of iron acetate, palladium acetate, nickel acetate, and molybdenum acetate.

21. The method of claim 18, wherein the deposition temperature is between about 680° C. and about 900° C.

* * * * *